US011962459B1

(12) United States Patent
Mashuryan (10) Patent No.: US 11,962,459 B1
(45) Date of Patent: Apr. 16, 2024

(54) INTELLIGENT TRAFFIC CONTROL IN A BRIDGE USING CLOUD-BASED CONTROL FOR CONNECTED IoT DEVICES (71) Applicant: Heltun, Inc., Los Altos Hills, CA (US)

(72) Inventor: Ashot Mashuryan, Yerevan (AM)

(73) Assignee: HELTUN, INC., Los Altos Hills, CA (US)

(*) Notice: Subject to any disclaimer, the term of this patent is extended or adjusted under 35 U.S.C. 154(b) by 0 days.

(21) Appl. No.: 17/302,892

(22) Filed: May 14, 2021

Related U.S. Application Data (60) Provisional application No. 63/026,075, filed on May 17, 2020.

(51) Int. Cl.
H04L 41/0806 (2022.01)
G16Y 40/35 (2020.01)
H04L 12/46 (2006.01)
H04L 67/025 (2022.01)
H04L 67/10 (2022.01)

(52) U.S. Cl.
CPC ........ H04L 41/0806 (2013.01); H04L 12/462 (2013.01); H04L 67/025 (2013.01); H04L 67/10 (2013.01); G16Y 40/35 (2020.01)

(58) Field of Classification Search
CPC .................................................. H04L 12/462
See application file for complete search history.

(56) References Cited

U.S. PATENT DOCUMENTS

| 5,894,471 | A | * | 4/1999 | Miyagi | H04Q 11/0478 370/230 |
| 9,774,604 | B2 | | 9/2017 | Zou et al. | |
| 10,291,714 | B2 | | 5/2019 | Mathews et al. | |
| 10,362,037 | B2 | | 7/2019 | Zou et al. | |
| 2010/0106962 | A1 | * | 4/2010 | Chen | H04L 63/065 713/153 |

(Continued)

OTHER PUBLICATIONS

Non-Final Office Action in U.S. Appl. No. 17/302,888 dated Jun. 15, 2022.

(Continued)

Primary Examiner — Kevin T Bates
Assistant Examiner — Emad Siddiqi
(74) Attorney, Agent, or Firm — Arluys IP, P.C.

(57) ABSTRACT

Systems and methods for intelligent traffic control within a bridge that allows efficient and timely communication between Internet of Things (IoT) devices and a cloud-based server are disclosed. One method is for adding an IoT device to a cloud-based system for controlling IoT devices. The method includes in response to determining there is a request from a user to add an IoT device, obtaining information pertaining to the IoT device. The method further includes adding the IoT device to the cloud-based system via a bridge installed in the cloud-based system, where adding the IoT device to the cloud-based system includes sending required data to the IoT device via the bridge according to a communication protocol of the IoT device. The method further includes determining whether the IoT device was successfully added to the cloud-based system. The method further includes in response to determining the IoT device was successfully added, updating the bridge with the information pertaining to the IoT device.

16 Claims, 9 Drawing Sheets (56) References Cited

U.S. PATENT DOCUMENTS

| | | |
|---|---|---|
| 2016/0182309 A1* | 6/2016 | Maturana ......... G05B 19/41885 709/224 |
| 2018/0082575 A1 | 3/2018 | El-Mankabady |
| 2018/0234266 A1 | 8/2018 | Dell |
| 2019/0081503 A1 | 3/2019 | Kim |
| 2019/0206231 A1 | 7/2019 | Armstrong et al. |
| 2019/0239048 A1* | 8/2019 | Nuttall ................... H04L 67/34 |
| 2020/0275278 A1 | 8/2020 | Hanawa et al. |
| 2021/0314183 A1* | 10/2021 | Ward .................. H04L 65/1016 |
| 2021/0314407 A1 | 10/2021 | Ng et al. |
| 2022/0171392 A1 | 6/2022 | Park et al. |

OTHER PUBLICATIONS

Final Office Action in U.S. Appl. No. 17/302,888 dated Feb. 13, 2023.

\* cited by examiner

INTELLIGENT TRAFFIC CONTROL IN A BRIDGE USING CLOUD-BASED CONTROL FOR CONNECTED IoT DEVICES

CROSS REFERENCE TO RELATED APPLICATIONS

This application claims the benefit of U.S. Provisional Application No. 63/026,075 filed on May 17, 2020, the disclosure of which is incorporated herein by reference.

TECHNICAL FIELD

Embodiments of the disclosure relate to cloud-based control of Internet of Things (IoT) devices, and more specifically, relate to intelligent traffic control of connected IoT devices using a universal bridge.

BACKGROUND

Internet of things (IoT) refers to a system of interrelated computing devices, mechanical and digital machines that are provided with unique identifiers (UIDs) and the ability to transfer data over a network without requiring human-to-human or human-to-computer interaction. IoT devices can be used in the fields such as real-time analytics, machine learning, sensors, control systems, manufacturing, vehicular communication systems, automation (home and building automation), etc. Examples of IoT devices include lighting fixtures, thermostats, home security, appliances, etc.

Figure 1:
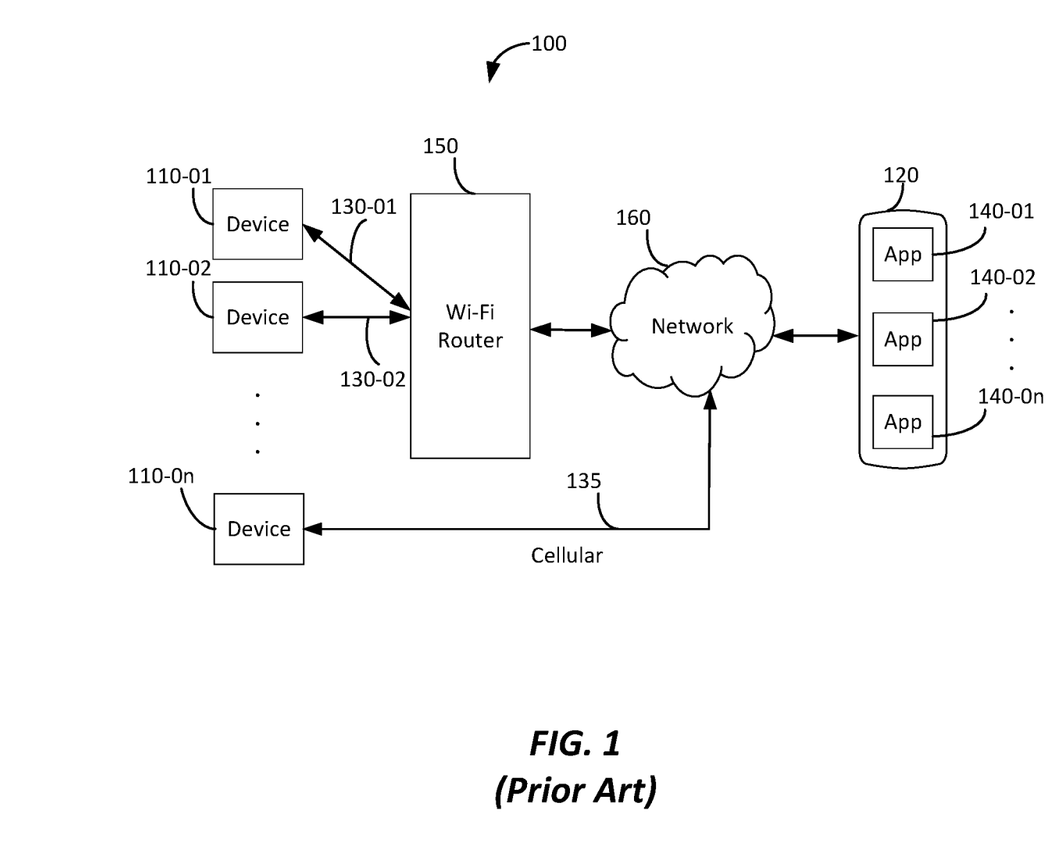
FIG. 1 is a block diagram illustrating a conventional IoT system, where IoT devices are connected to the Internet.

FIG. 1 is a block diagram illustrating a conventional IoT system, where IoT devices are connected to the Internet. In FIG. 1, devices 110-01, 110-02, ..., 110-0n (such as IoT devices) are connected to controller 120 over Internet/network 160. Controller 120 can be a mobile device (e.g., smartphone, tablet-computer, etc.). In this example, devices 110-01, 110-02 are connected to the network 160 via Wi-Fi network or Wi-Fi router 150. Device 110-0n is connected directly to the network 160. Examples of such connections include POTS (Plain Old Telephone Service) or cellular (3G, 4G, long term evolution (LTE), etc.), wired (Ethernet etc.) or other types of connections (e.g., satellite). In some cases, devices 110-01, ..., 110-0n can communicate directly to controller 120 via a communication protocol, such as Bluetooth, etc. Devices 110-01, 110-02, ..., 110-0n are controlled by apps (or software applications) 140-01, 140-02, ..., 140-0n, respectively, on controller 120. Smart digital assistants/speakers, such as Siri, Alexa, Google, etc., in turn call the apps 140-01, ..., 140-0n. As the number of devices 110 increases and with all the devices collecting and sharing data, they can cause congestion and slow-down of communication. Therefore, it is possible that critical data does not reach the controller 120 in time for a corrective action. This problem is further exacerbated in case of a failure in the communication method or operation. For instance, a security system is unable to communicate due to intentional malicious actions of burglars.

Accordingly, there is a need for a better solution to overcome such communication bandwidth problem. The solution should allow for critical communication being sent to the controller 120 on a higher priority.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

With multiple connected (IoT) devices are trying to communicate to a cloud-based controller through a universal bridge, there is possibility of congestion and slow-down of communication. This can result in critical data not reaching the cloud control system in time for any immediate corrective action needed. Systems and methods are disclosed that implement intelligent traffic control within the bridge that allow for efficient and timely communication between the connected devices and cloud-based controller.

According to one aspect, a computer-implemented method of adding an IoT device to a cloud-based system for controlling IoT devices is provided. The method includes in response to determining there is a request from a user to add an IoT device, obtaining information pertaining to the IoT device. The method further includes adding the IoT device to the cloud-based system via a bridge installed in the cloud-based system, where adding the IoT device to the cloud-based system includes sending required data to the IoT device via the bridge according to a communication protocol of the IoT device. The method further includes determining whether the IoT device was successfully added to the cloud-based system. The method further includes in response to determining the IoT device was successfully added, updating the bridge with the information pertaining to the IoT device.

According to another aspect, a computer-implemented method for monitoring a communication connection is provided. The method includes (i) sending, by a cloud-based server to a bridge, a first payload on one or more first available connections. The first payload includes connection attributes regarding the first available connections. The method further includes (ii) receiving, by the cloud-based server from the bridge, a second payload on one or more second available connections. The second payload includes connection attributes regarding the second available connections. The method further includes (iii) updating, by the cloud-based server, the bridge with connection information. The method further includes (iv) waiting, by the cloud-based server, for a required amount of time. The method further includes repeating (i)-(iv) when the required amount of time expires.

According to yet another aspect, a computer-implemented method for uploading data from a bridge to a cloud-based server is provided. The bridge is coupled to a plurality of Internet of Things (IoT) devices. The method includes receiving, by the bridge, data from at least one IoT device. The method further includes checking, by the bridge, connection attributes received from the cloud-based server. The method further includes aggregating, by the bridge, the received data from the at least one IoT device based on the connection attributes. The aggregated data is included in an upload packet. The method further includes sending, by the bridge, the upload packet to the cloud-based server over a network.

According to still another aspect, a computer-implemented method for downloading data to a bridge from a cloud-based server is provided. The bridge is coupled to a plurality of Internet of Things (IoT) devices. The method includes receiving, by the bridge, a download packet from the cloud-based server over a network. The download packet includes a header, a tail, and aggregated data. The method further includes unformatting, by the bridge, the received download packet to obtain the aggregated data. The method further includes segregating, by the bridge, the aggregated data to obtain a plurality of data packets. The method further includes sending, by the bridge, the data packets to respective IoT devices.

Figure 2:
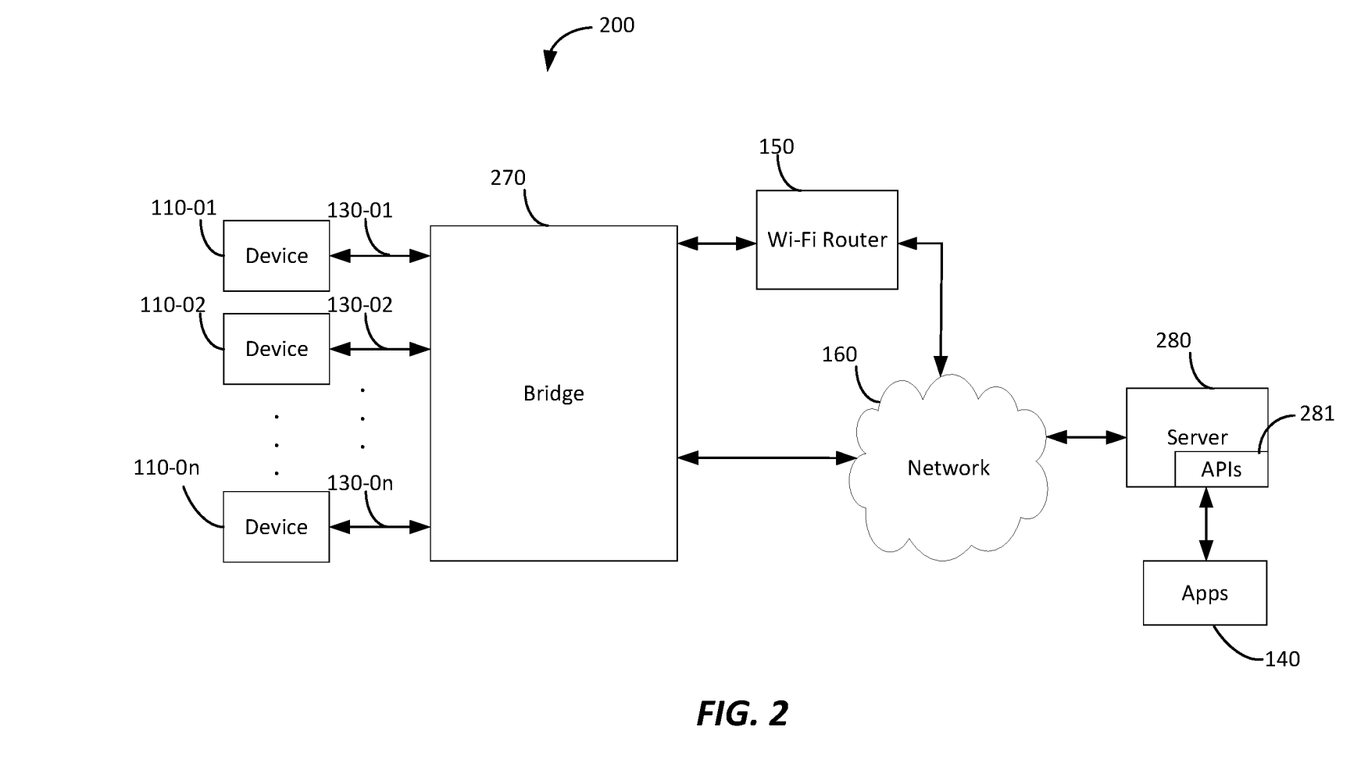
FIG. 2 is a block diagram illustrating an example system using a universal bridge according to an embodiment.

FIG. 2 is a block diagram illustrating an example system using a universal bridge according to an embodiment. In FIG. 2, connected devices 110-01, 110-02, . . . , 110-0n (e.g., IoT devices) are connected or coupled to a universal bridge 270 using various communication protocols 130-01, 130-02, . . . , 130-0n. Examples of protocols 130 are Bluetooth, LoRa, ZigBee, Z-Wave, Wi-Fi, etc. Bridge 270 may be connected or coupled to server 280 over network/Internet 160. Bridge 270 can connect to network 160 via Wi-Fi router 150. Bridge 270 can connect to the server 280 using other types of connections, such as wired connections (e.g., Ethernet, fiber, etc.) or wireless connections (e.g., WiFi, cellular 3G, 4G, LTE, 5G, satellite, etc.). The connection between the server 280 and the bridge 270 allows for the server 280 to send instructions to the bridge 270 on how to communicate and send data from each of devices 110 to the server 280, and vice versa.

In an embodiment, bridge 270 can connect to server 280 using multiple connections to allow for redundancy. For example, bridge 270 can connect to server 280 using multiple wired interfaces as well as multiple wireless connections. Many different configurations are possible in terms of connectivity between server 280 and bridge 270, which are driven by cost and system goals. Server 280 may include application programming interfaces (APIs) 281 that allow for control of devices 110 or bridge 270 by one or more software applications (or apps) 140. Apps 140 may be installed on a controller, such as controller 120 as previously described, and the controller may be communicatively coupled to server 280 directly or over a network (e.g., network 160). APIs 281 may be provided by various smart speaker/digital assistants to server 280 to enable integration with digital assistants, such as Siri, Alexa, Google, etc. (not explicitly shown in the figure) or other software.

Figure 3:
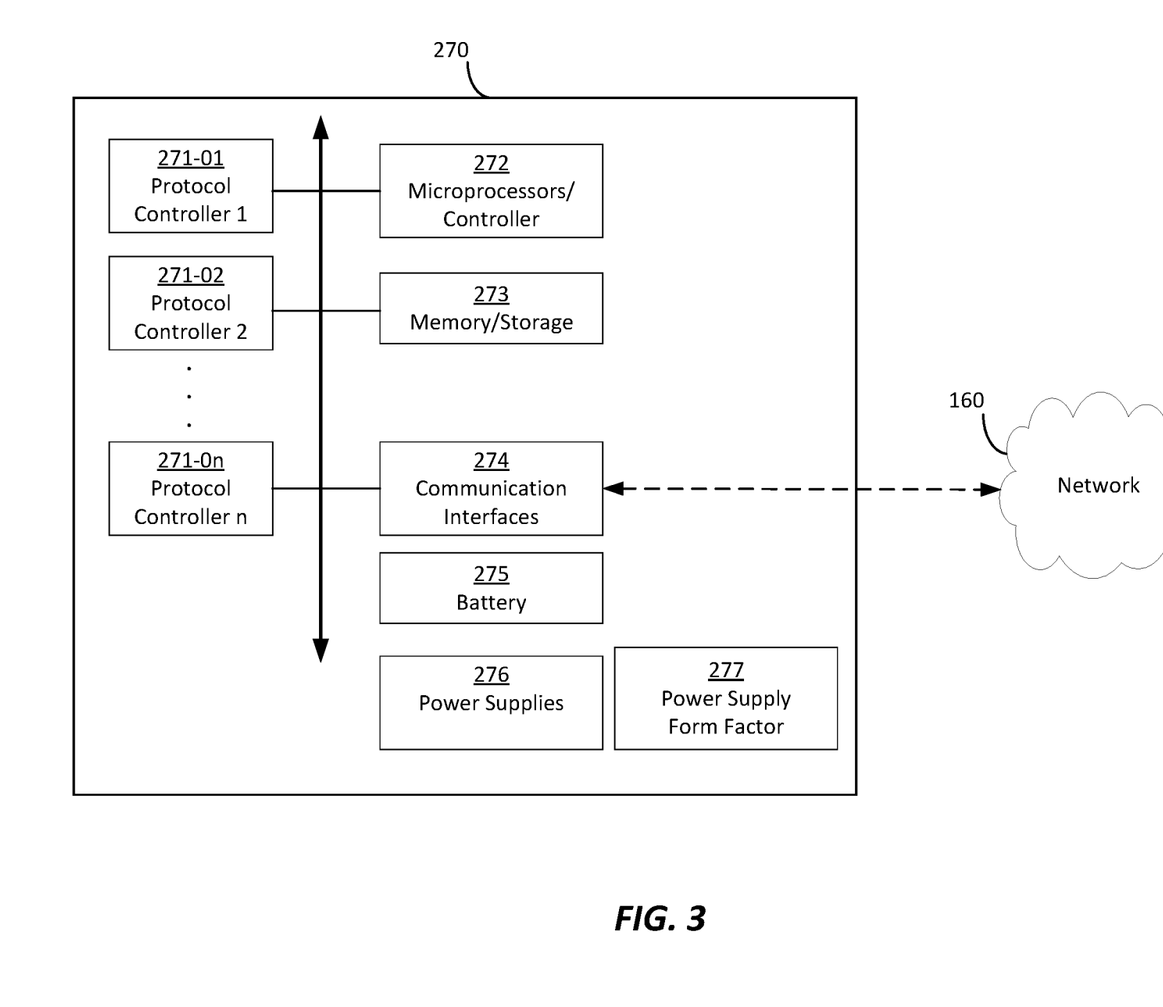
FIG. 3 is a block diagram illustrating an example bridge according to an embodiment.

FIG. 3 is a block diagram illustrating an example bridge according to an embodiment. In some embodiments, the bridge is bridge 270 previously shown in system 200 of FIG. 2. As shown in FIG. 3, bridge 270 can include any number of protocol controllers 271-01, 271-02, . . . , 271-0n. For example, protocol controller 271-01 can be used to implement or control a first communication protocol (e.g., Bluetooth), protocol controller 271-02 can be used to implement or control a second communication protocol (e.g., LoRa), and protocol controller 271-0n can be used to implement or control multiple communication protocols (e.g., Zigbee, Z-Wave, Bluetooth, etc.). Based on the implementation or control of the protocols, a protocol controller 271 can be used to communicate with several connected devices 110, thereby allowing simultaneous control of multiple devices 110. Bridge 270 can include one or more microprocessors or controllers 272 to control the bridge 270. Bridge 270 can also include various kinds of memory and storage devices 273. Memory devices can include volatile and non-volatile memory (e.g., random access memory (RAM), dynamic RAM (DRAM), synchronous DRAM (SDRAM), static RAM (SRAM), etc.), and storage devices can include a hard disk drive (HDD), solid state drive (SSD), a HDD with a smaller amount of SSD storage to act as a SSD cache, a flash device, etc. The memory/storage devices 273 may serve to buffer data flowing between devices 110 and server 280. The memory devices 273 can also be used to store instructions provided by server 280, which are executed by microcontrollers 272, either at startup or periodically. The memory/storage devices 273 can be used to store a bridge firmware (e.g., for restoring the system). The storage devices can be used as secondary storage or for audit purposes, etc. Communication interfaces 274 allow the bridge 270 to communicate with server 280 over network 160. Communication interfaces 274 can include wired (e.g., Ethernet), or wireless (e.g., WiFi, cellular—3G, 4G, LTE, 5G, etc.). Communication interfaces 274 may include other functionality, such as encryption functions, etc.

With continued reference to FIG. 3, bridge 270 can also include a battery 275 (which may be optional in some embodiments) to allow operation during power outages. This can be critical for certain devices 110, such as security monitoring devices, or for monitoring other mission critical, such as medical devices, etc. In addition, bridge 270 may include power supplies 276 that accept standard power input voltage (e.g., 110V, 220V, etc.) and provide power to various components within the bridge 270. In an embodiment, bridge 270 can include power supply form factors 277 that conform to mechanical form factors required by a local power supply. In some embodiments, the functionality of bridge 270 can be implemented using processors, discrete components (such as processors, DSP (digital signal processor) and memory), SoC (system-on-chip), field programmable gate arrays (FPGAs), ASICs (application specific integrated circuit), PCB (printed circuit board) or a combination thereof.

The embodiments of the disclosure may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, or the like.

Figure 4:
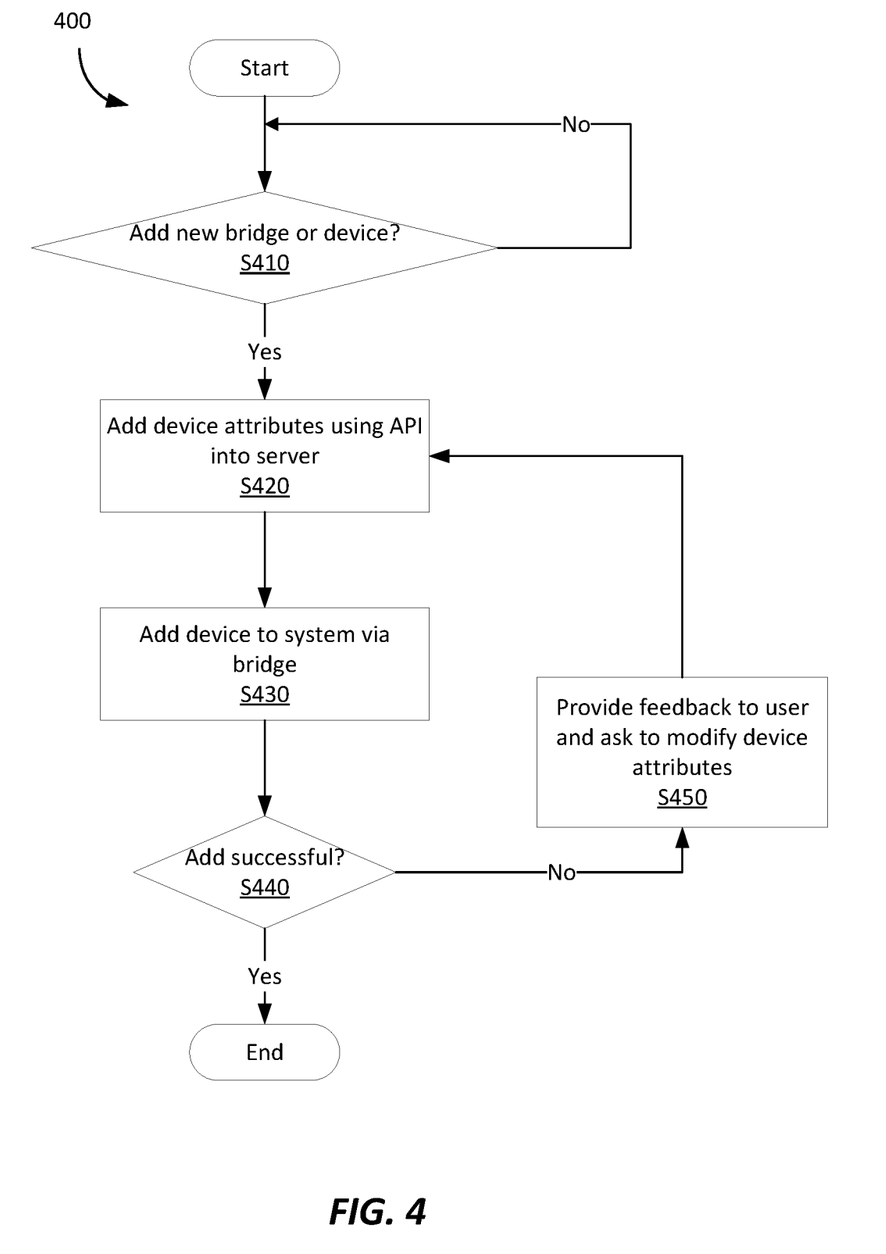
FIG. 4 is a flow diagram illustrating an example method for adding a new bridge or device to the system according to an embodiment.

FIG. 4 is a flow diagram illustrating an example method for adding a new bridge or device to the system according to an embodiment. The bridge and device, for example, may be bridge 270 and device 110 of system 200, respectively. In some embodiments, method 400 may be performed by server 280, bridge 270, or a combination thereof.

Referring to FIG. 4, method 400 starts at block S410, where a user may want to add a new device 110 or bridge 270 to the system 200 of FIG. 2. Therefore, at block S410, it is determined whether there is a user request to add the new bridge 270 or device 110.

If yes, at block S420, the user may add the new device 110 using an API 281 included in the server 280. In order to add a new device 110, system 200 first checks if there is an existing bridge 270 in the system 200. If the system 200 does not have an existing bridge 270 in the system 200, system 200 may prompt the user to add the bridge 270 to the system 200. In this block, system 200 may prompt the user to add relevant details or information pertaining to the device 110. The details may include manufacturer information and identification information (e.g., name, version, QR code, special key/ID, etc.). In one embodiment, the system 200 maintains a database (not explicitly shown) with device information and retrieves relevant information pertaining to the device 110 being added. System 200 may verify with the user if the information retrieved is accurate. In another embodiment, the system 200 may search the Web and retrieve the information pertaining to the device 110 being added. If the information are not accurate, system 200 may prompt the user to add the relevant information and update the database accordingly. The retrieved information of device 110 may include functionality and/or protocol supported. If the information of device 110 are not available, system 200 may prompt (e.g., via API 281) the user to enter the relevant information and update the database accordingly. API 281 may prompt the user for information regarding his or her intended usage of the added device 110. The information may include a usage type (e.g., security, convenience, etc.), functionality, usage patterns, frequency of use, time of usage, etc. This information is stored by server 280 and used by system 200 to determine priority of the communication with the device. System 200 may use artificial intelligence (AI) to continuously monitor the usage patterns, etc. of the device 110 (will be described in more detail herein below) and update the communication priority, etc.

At block S430, server 280 may add (or attempt to add) the device 110 to the system 200 via bridge 270. In this block, server 280 may send the required data to device 110 via bridge 270 in accordance with a protocol 130 of the device 110. These details are generally specified by protocol specification. Server 280 follows the specifications to establish a reliable connection between the device 110 and bridge 270 at both the physical level and link level. In one embodiment, bridge 270 handles the physical level requirements using a protocol controller 271 (shown in FIG. 3), and the server 280 handles the other required data to establish a link level connection between added device 110 and the bridge 270.

At block S440, method 400 determines whether the addition of the new device was successful. If the addition of the device was successful, method 400 updates bridge 270 and its database for future learning and then the method 400 terminates. If the addition was unsuccessful, the system 200, via API 281, provides feedback to the user at block 450. The feedback may include specific error message/error code along with further instructions. The AI learning included in the system may suggest further actions to the users. The actions may include changing or modifying certain settings or attributes within the device 110, e.g., configuration switches. Other actions may include changing the physical location or specific power/reset sequencing, etc.

While preceding method 400 describes the addition of device 110 to the system 200, the method for adding a bridge 270 to the system 200 is similar with the difference being certain steps may be omitted (e.g., S420). Therefore, for brevity sake, the method of adding bridge 270 to system 200 will not be described in detail herein.

Figure 5:
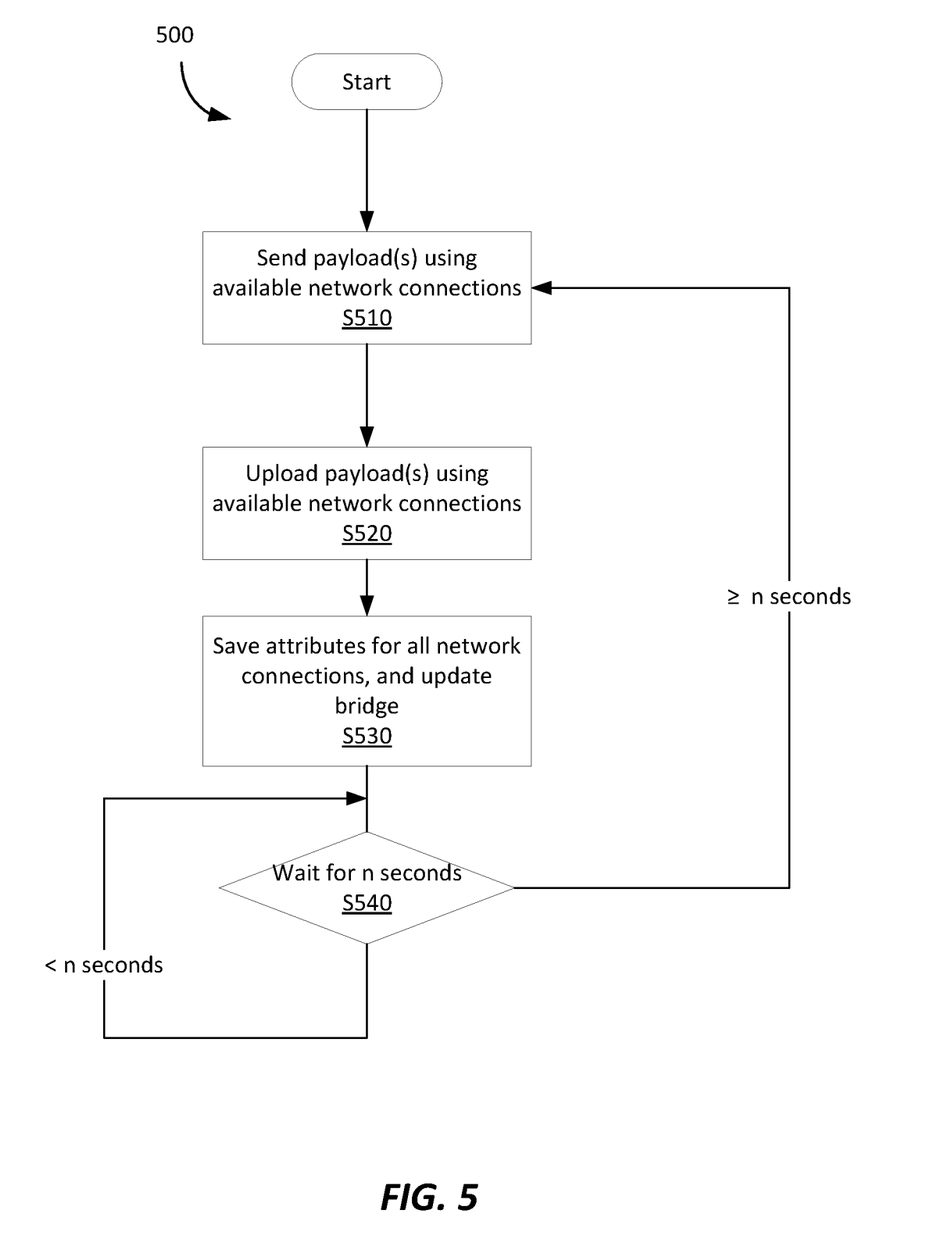
FIG. 5 is a flow diagram illustrating an example method for monitoring connections between a bridge and a server according to an embodiment.

FIG. 5 is a flow diagram illustrating an example method for monitoring connections between a bridge and a server according to an embodiment. The bridge and server, for example, may be bridge 270 and server 280 of system 200, respectively, as shown in FIG. 2. Method 500 may run periodically, where the periodicity may be configurable. For instance, method 500 can run once every 1 hour during night times, while it can run every 5 minutes during day times. The periodicity can change based upon the connected devices 110 and also based upon the learning of the system 200.

Referring to FIG. 5, method 500 starts at block 510, where server 280 sends a (test) payload on available connections (e.g., wired, wireless, etc.) to the bridge 270. Upon receiving the payload, bridge 270 saves various attributes regarding each of the connections (e.g., latency, quality—errors) and sends this information back to server 280. Though it is not described explicitly here, the payload may include various attributes that allow for the measurement of the various connection attributes (e.g., latency, bandwidth).

At block 520, bridge 270 sends or uploads a payload on available connections (wired, wireless, etc.) to server 280. Server 280, upon receiving the payload, saves the various attributes regarding each of the connections (block 530) and sends this information back to bridge 270.

At block S530, server 280 may update the bridge 270. The updates to the bridge may include a type of connection to use (e.g., wired connection only), a specific type of connection to use for each device 110 (e.g., wired connection for device 110-01, wireless connection for device 110-02, simultaneously wired and wireless connection for device 110-03, etc.), and other directives (e.g., aggregate data from device 110-02, 110-03, and 110-04 before uploading, etc.).

At block S540, method 400 waits for a required amount of time (n seconds), as described above, and the method 400 continues operation (e.g., returns to S510) after waiting for the required amount of time (i.e., after the required amount of time expires).

Although the preceding discussion regarding method 400 has been presented as sequential steps, it is noted that block S520 may be operated independent to block S510 and S530. Also, the periodicity (S540) for block S520, S510 and block S530 can be different. For instance, block S520 can operate with a periodicity of n seconds (e.g., 1 hour), whereas block S510 can operate with a periodicity of m seconds (e.g., 5 minutes) and S530 can operate with a periodicity of y seconds (e.g., 2 hours). Further, the periodicity for each connection and each direction (server 280 to bridge 270 or bridge 270 to server 280) can also be configured to be different. For instance, periodicity for a wired connection between bridge 270 to server 280 can be 1 hour, whereas periodicity for a wireless connection between bridge 270 to server 280 can be 1 minute.

Figure 6:
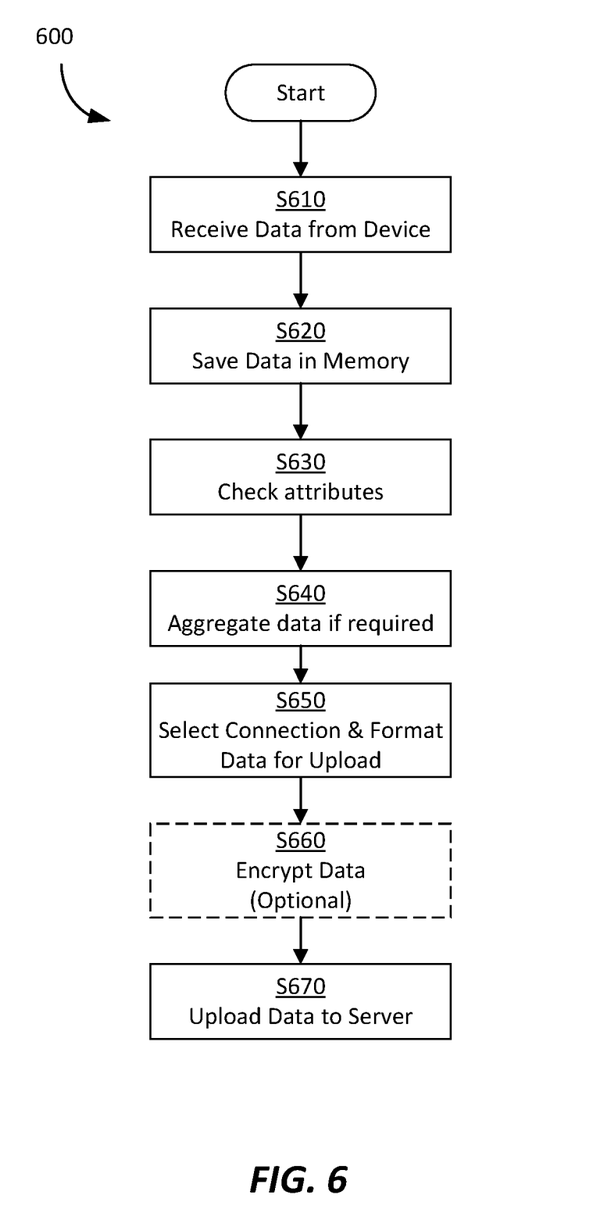
FIG. 6 is a flow diagram illustrating an example method for uploading data from the bridge to the server according to an embodiment.

FIG. 6 is a flow diagram illustrating an example method for uploading data from the bridge to the server according to an embodiment. The bridge and server, for example, may be bridge 270 and server 280 of system 200, respectively, as shown in FIG. 2.

Referring to FIG. 6, at block S610, the bridge 270 receives data from a device 110.

At block S620, the bridge 270 may save the data into memory 273.

At block S630, the bridge 270 may check the attributes received from server 280. These attributes are sent by server 280 (as previously described with respect to methods 400 and 500). The attributes may include, but not limited to: a priority for the data received at block S610, a type of connection to use (e.g., wired, wireless, etc.), whether the data received at block S610 can be aggregated with data received (or to be received) from the same device, whether data can be aggregated with data received (or to be received) from other devices, and a time period (or another condition, such as specific data from a device) the bridge 270 is to wait for aggregation before timing out and sending data to the server 280. The connection used for sending the data can depend upon many factors, such as availability, bandwidth, latency, cost, etc.

At block S640, the bridge may aggregate the data received based on the attributes retrieved at block S630.

Figure 7:
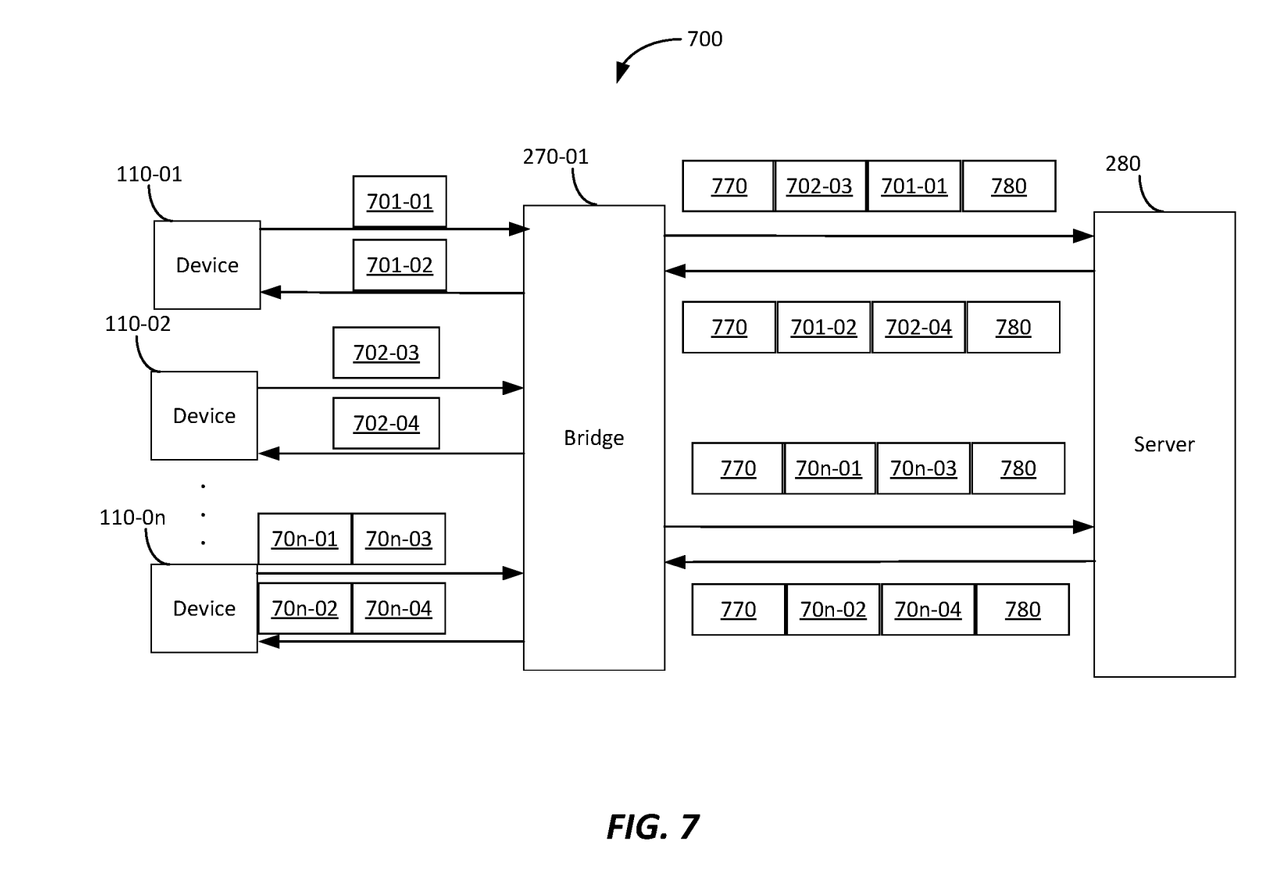
FIG. 7 is a block diagram illustrating an example system of aggregating and formatting data packets received from devices before uploading the data packets to the server according to an embodiment.

FIG. 7 shows an example of how data is aggregated and formatted (block S650) before being uploaded to the server. It should be noted that the data shown in FIG. 7 is shown as packets for convenience. Protocol controller 271 may handle the physical requirements and the data is packetized before transmission to and from the server 280. Referring to FIG. 7, the data communicated to device 110-01 is labeled as 701-*xx*, data communicated to device 110-02 is labelled as 702-*xx*, and so on. The data packets from device 110 end in an odd number, e.g., 70*x*-01, 70*x*-03, 70*x*-05, and so on, where the first packet sent is 70*x*-01, the second packet sent is 70*x*-03, and so on. Similarly, data packets sent to the device 110 end in an even number, e.g., 70*x*-02, 70*x*-04, 70*x*-06, and so on, where the first packet sent is 70*x*-02, the second packet sent is 70*x*-04, and so on. The labelling here is used as an aid in the descriptions only and it can be in any format. As shown, bridge 270-01 may add a header 770 to the data 701-01. Header 770 may include information regarding the sender (e.g., bridge identifier (ID), device IDs), transfer length, and other relevant information regarding the data being transmitted. It may also, for instance, include information to indicate an urgency with regards to data being uploaded. The bridge 270-01 may also add additional data as a digest or tail (labelled 780 in FIG. 7). For instance, the digest 780 can include error checking (CRC-32), priority, etc. The header, data and digest collectively can be referred to as an upload packet or download packet herein. In some embodiments, information included in header 770 and information included in digest 780 can be different for every upload or download packet.

FIG. 7 shows two examples of data aggregation. In the first example, data from two different devices 110-01 and 110-02 are aggregated before transmission to and from the server 280. In the second example, two packets from the same device 110-0*n* are aggregated. In some embodiments, depending on the attributes received from server 280 (at block S630), bridge 270 may skip sending certain information from a device 110 to server 280, thereby skipping the aggregation of certain data from such device 110 before transmission to server 280. Other combinations are possible and are not described in detail herein.

At block S650, based on the attributes (retrieved at block S630), a connection may be selected. Based upon the selected connection, an actual format of the header 770 and digest 780 can vary. Also, the actual length of the upload packet can also change.

At block S660, the data may be encrypted (which may be optional in some embodiments), and at block S670 the data is uploaded to server 280. Though it is not explicitly shown in FIG. 6, the process can include handshake mechanism (e.g., Ack/Nack) or other mechanisms to ensure proper transmission of the data.

Figure 8:
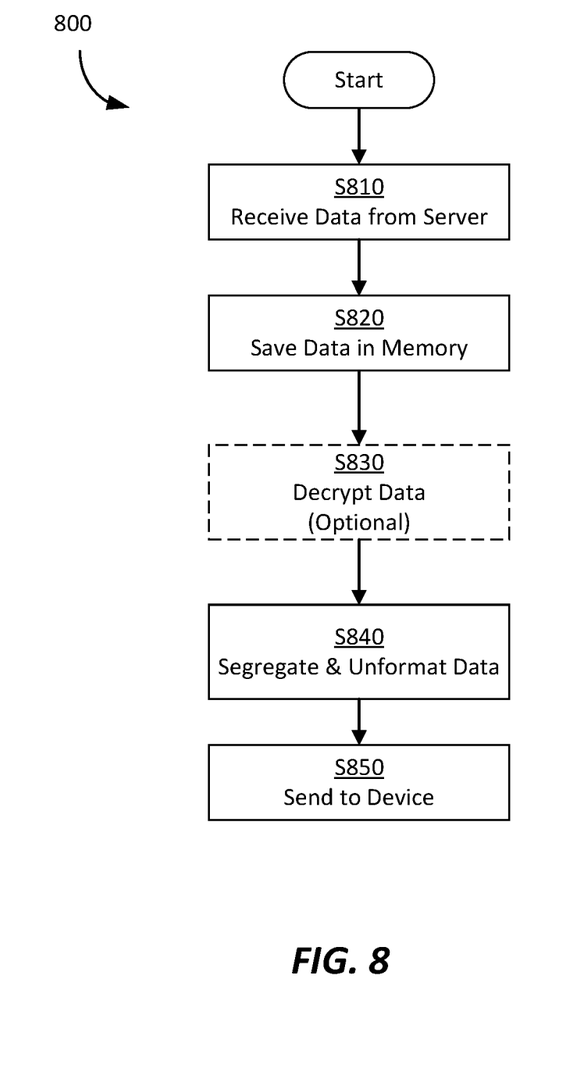
FIG. 8 is a flow diagram illustrating an example method for downloading data to the bridge from the server according to an embodiment.

FIG. 8 is a flow diagram illustrating an example method for downloading data to the bridge from the server according to an embodiment. The bridge and server, for example, may be bridge 270 and server 280 of system 200, respectively, as shown in FIG. 2.

At block S810, bridge 270 receives data from server 280. Server 280 may select a best network connection (e.g., wired, wireless etc.) for sending the data to the bridge 270 based on the priority, etc.

Referring to FIG. 7, like the upload packet, the download packet may include the header 770, data 701-02, and digest 780. Bridge 270 can use the digest 780 to ensure that the data was received properly. Bridge 270 may provide an appropriate handshake mechanism (e.g., Ack/nack) to the server 280. Header 770 may include information regarding the sender as well as destination (e.g., bridge ID, device IDs, etc.).

At block S820, bridge 270 may save the data to memory, and at block S830 bridge may decrypt the data (which may be optional in some embodiments).

At block S840, bridge 270 may segregate and/or unformat the data. Like the upload packet, the download packet can optionally include data aggregation. For instance, server 280 can send data packets 701-02, 702-02, etc. as a single download packet, as illustrated in FIG. 7.

At block S850, the bridge 170 may send the data packets 701-02, 702-02, etc. to the appropriate device 110-01, 110-02, etc.

The preceding discussions with regards to methods 500, 600 and 800 focus on a universal bridge but those skilled in art can extend the methods disclosed in this application to other generic gateways and/or bridges. Any device, such as a Wi-Fi router (or home gateway), can be instructed by the server to give higher priority to the critical data.

Figure 9:
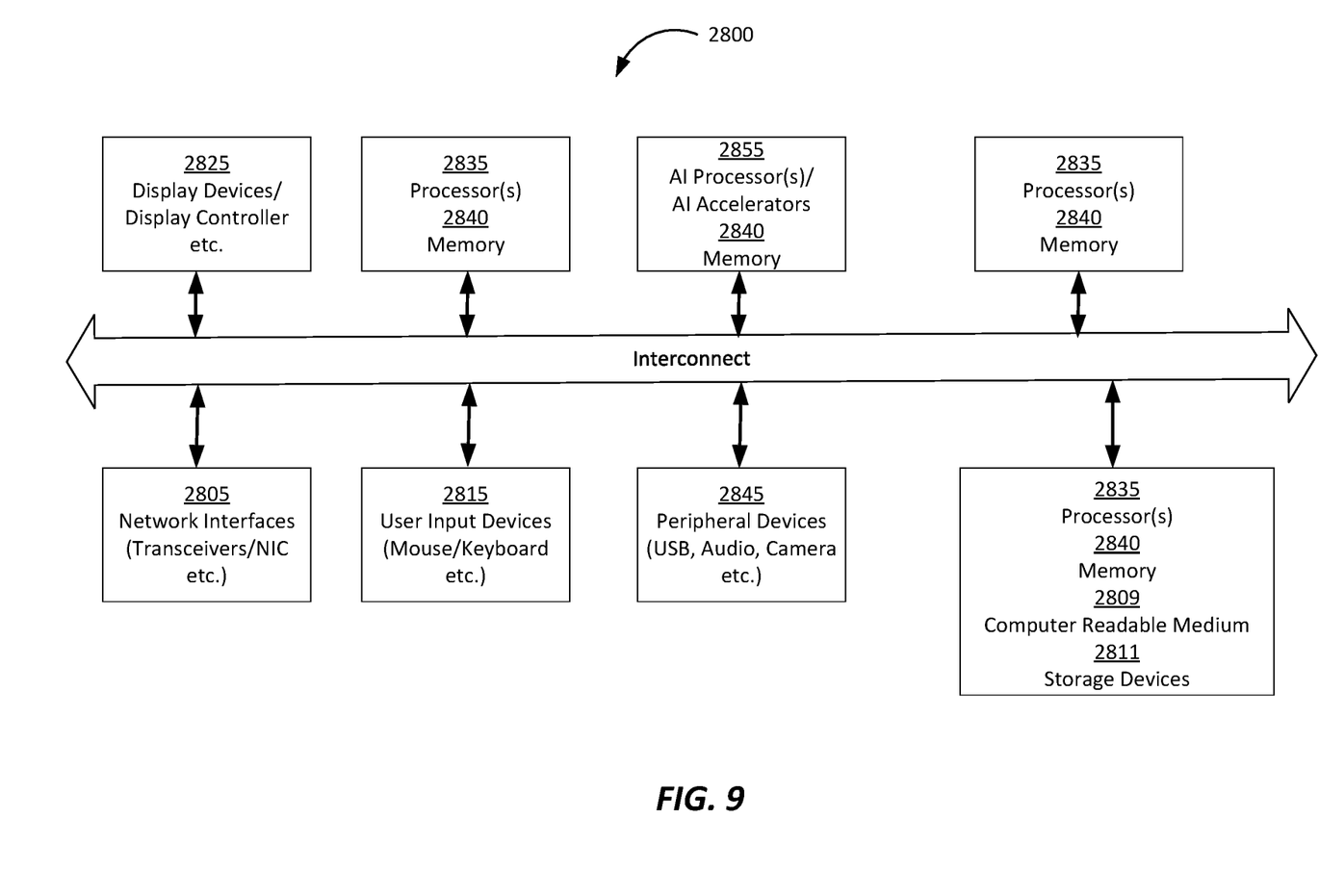
FIG. 9 is a block diagram illustrating an example server according to an embodiment.

FIG. 9 is a block diagram illustrating an example server according to an embodiment. The server, for example, may be the server 280 of FIG. 2. As shown, server 2800 can include multiple processors (2835), memories (2840), AI processors (2855), AI accelerators, network interfaces (2805), user input devices (2815), and peripheral devices (2845). While FIG. 9 illustrates a generic server, the server 2800 can be implemented as a cloud server, distributed server, edge-server, or a combination thereof. AI processor/AI accelerators 2855 allow for the system to learn autonomously and allow for a better user experience. AI accelerators 2855 are used to continuously monitor the data being transferred between server 2800, bridge 270, and various IoT devices 110. Based on the traffic patterns, the usage and user preferences, AI accelerators 2855 may change how often the various blocks within method 500 should run. AI accelerators 2855 may, for instance, by default choose a lower cost communication medium (e.g., wired/wireless) for method 600 and method 800 based on user preferences but it may instruct bridge 270 to use the lowest latency communication medium for critical devices (e.g., security devices). The above-mentioned cloud-server can also be a local server dedicated only for a specific building (e.g., a hotel).

The processes or methods described and illustrated may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for uploading data from a bridge to a cloud-based server, the bridge being coupled to a plurality of Internet of Things (IoT) devices, the method comprising:
   receiving, by the bridge, data from at least one IoT device;
   checking, by the bridge, connection attributes received from the cloud-based server wherein the connection attributes include a priority for the received data, a type of connection to use, an indication whether the received data can be aggregated with other data received from the same at least one IoT device, an indication whether the received data can be aggregated with other data received from another IoT device, and a time period the bridge is to wait for aggregation before timing out;
   aggregating, by the bridge, the received data from the at least one IoT device based on the connection attributes, the aggregated data being included in an upload packet; and
   sending, by the bridge, the upload packet to the cloud-based server over a network.

2. The method of claim 1,
   wherein the receiving data from the at least one IoT device comprises:
      receiving first data from a first IoT device, and
      receiving second data from a second IoT device;
   wherein aggregating the received data from the at least one IoT device comprises:
      aggregating the first received data with the second received data to form the aggregated data, and
      adding a header and a tail to the aggregated data as the upload packet.

3. The method of claim 1,
   wherein the receiving data from the at least one IoT device comprises:
      receiving first data from a first IoT device, and
      receiving second data from the first IoT device;
   wherein aggregating the received data from the at least one IoT device comprises:
      aggregating the first received data with the second received data to form the aggregated data, and
      adding a header and a tail to the aggregated data as the upload packet.

4. The method of claim 1, wherein aggregating the received data from the at least one IoT device comprises:
   selecting a connection based on the connection attributes, and
   selecting a format of a header and a format of a tail based on the selected connection.

5. The method of claim 4, wherein the header includes information regarding a sender, a transfer length, and information regarding the aggregated data, and the tail includes an error checking information and a priority information.

6. The method of claim 1, further comprising: prior to sending the upload packet to the cloud-based server, encrypting the aggregated data included in the upload packet.

7. The method of claim 1,
   wherein the aggregated data is first aggregated data;
   the method further comprising:
      downloading particular data to the bridge from the cloud-based server, wherein downloading particular data to the bridge comprises:
         receiving, by the bridge, a download packet from the cloud-based server over a network, the download packet including a header, a tail, and second aggregated data;
         unformatting, by the bridge, the received download packet to obtain the second aggregated data;
         segregating, by the bridge, the second aggregated data to obtain a plurality of data packets; and
         sending, by the bridge, the plurality of data packets to respective IoT devices.

8. The method of claim 7, wherein prior to unformatting the download packet, decrypting the second aggregated data included in the download packet.

9. A system comprising one or more processors and one or more storage media storing one or more computer programs for execution by the one or more processors, the one or more computer programs configured to perform a method for uploading data from a bridge to a cloud-based server, the bridge being coupled to a plurality of Internet of Things (IoT) devices, the method comprising:
   receiving, by the bridge, data from at least one IoT device;
   checking, by the bridge, connection attributes received from the cloud-based server, wherein the connection attributes include a priority for the received data, a type of connection to use, an indication whether the received data can be aggregated with other data received from the same at least one IoT device, an indication whether the received data can be aggregated with other data received from another IoT device, and a time period the bridge is to wait for aggregation before timing out;
   aggregating, by the bridge, the received data from the at least one IoT device based on the connection attributes, the aggregated data being included in an upload packet; and
   sending, by the bridge, the upload packet to the cloud-based server over a network.

10. The system of claim 9,
wherein the receiving data from the at least one IoT device comprises:
  receiving first data from a first IoT device, and
  receiving second data from a second IoT device;
wherein aggregating the received data from the at least one IoT device comprises:
  aggregating the first received data with the second received data to form the aggregated data, and
  adding a header and a tail to the aggregated data as the upload packet.

11. The system of claim 9,
wherein the receiving data from the at least one IoT device comprises:
  receiving first data from a first IoT device, and
  receiving second data from the first IoT device;
wherein aggregating the received data from the at least one IoT device comprises:
  aggregating the first received data with the second received data to form the aggregated data, and
  adding a header and a tail to the aggregated data as the upload packet.

12. The system of claim 9, wherein aggregating the received data from the at least one IoT device comprises:
  selecting a connection based on the connection attributes, and
  selecting a format of a header and a format of a tail based on the selected connection.

13. The system of claim 12, wherein the header includes information regarding a sender, a transfer length, and information regarding the aggregated data, and the tail includes an error checking information and a priority information.

14. The system of claim 9, wherein the method further comprises: prior to sending the upload packet to the cloud-based server, encrypting the aggregated data included in the upload packet.

15. The system of claim 9, wherein the aggregated data is first aggregated data; the method further comprising:
  downloading particular data to the bridge from the cloud-based server, wherein downloading particular data to the bridge comprises:
    receiving, by the bridge, a download packet from the cloud-based server over a network, the download packet including a header, a tail, and second aggregated data;
    unformatting, by the bridge, the received download packet to obtain the second aggregated data;
    segregating, by the bridge, the second aggregated data to obtain a plurality of data packets;
    and
    sending, by the bridge, the plurality of data packets to respective IoT devices.

16. The system of claim 15, wherein the method further comprises: prior to unformatting the download packet, decrypting the second aggregated data included in the download packet.

\* \* \* \* \*